(12) United States Patent
Lam et al.

(10) Patent No.: US 9,090,283 B1
(45) Date of Patent: Jul. 28, 2015

(54) STEERING KNUCKLE ASSEMBLY

(71) Applicant: ArvinMeritor Technology, LLC, Troy, MI (US)

(72) Inventors: Duy Lam, Baltimore, OH (US); Steven Hunter, Lancaster, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/184,083

(22) Filed: Feb. 19, 2014

(51) Int. Cl.
*B62D 7/18* (2006.01)
*B62D 7/20* (2006.01)

(52) U.S. Cl.
CPC .. *B62D 7/18* (2013.01); *B62D 7/20* (2013.01); *B60G 2206/50* (2013.01)

(58) Field of Classification Search
CPC ......... B62D 7/18; B62D 7/20; B60G 2206/50
USPC .................................................. 280/93.512
See application file for complete search history.

(56) References Cited

U.S. PATENT DOCUMENTS

| 1,302,989 | A | * | 5/1919 | Stensgard | 280/93.512 |
| 4,002,286 | A | * | 1/1977 | Simon | 228/174 |
| 6,419,250 | B1 | | 7/2002 | Pollock et al. | |
| 7,513,514 | B1 | * | 4/2009 | Schlosser et al. | 280/93.511 |
| 8,469,378 | B1 | * | 6/2013 | Bodary et al. | 280/93.512 |
| 2007/0273119 | A1 | * | 11/2007 | Stoia | 280/93.512 |
| 2013/0119628 | A1 | * | 5/2013 | Deierling et al. | 280/93.512 |
| 2014/0027994 | A1 | * | 1/2014 | Varela et al. | 280/93.512 |

FOREIGN PATENT DOCUMENTS

WO WO 2007062684 A1 * 6/2007

OTHER PUBLICATIONS

Detroit Diesel Corporation, "Detroit Steer Axles Technical Specifications," date unknown, Detroit Diesel Corporation.

* cited by examiner

*Primary Examiner* — James English
(74) *Attorney, Agent, or Firm* — Brooks Kushman P.C.

(57) ABSTRACT

A steering knuckle assembly having a steering knuckle and a steering arm. The steering knuckle may have a first arm and a second arm. The steering arm may be coupled to the first arm.

19 Claims, 5 Drawing Sheets

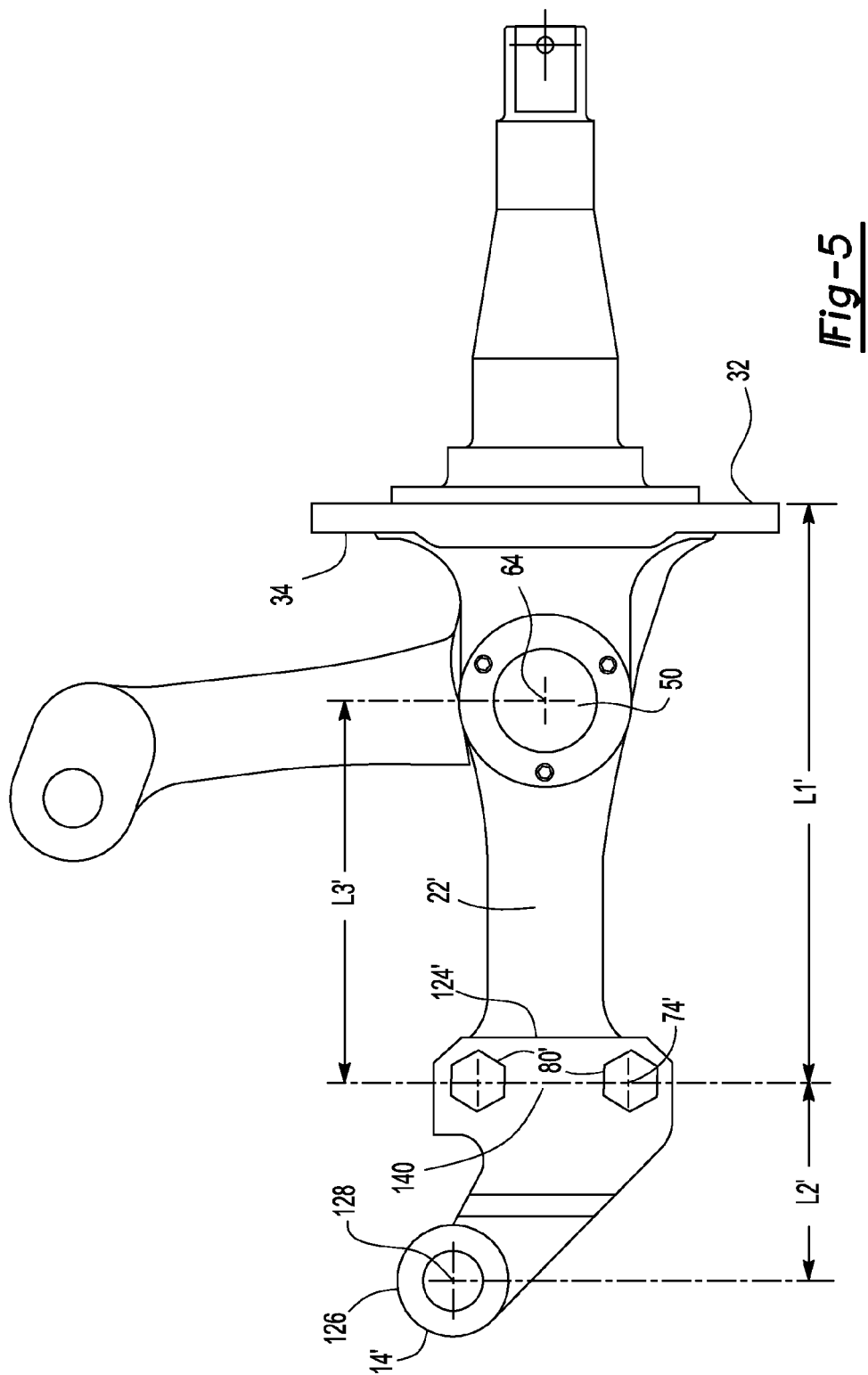

STEERING KNUCKLE ASSEMBLY

TECHNICAL FIELD

This patent application relates to a steering knuckle assembly for a vehicle.

BACKGROUND

A steering knuckle assembly is disclosed in U.S. Pat. No. 6,419,250.

SUMMARY

In at least one embodiment, a steering knuckle assembly is provided. The steering knuckle assembly may include a steering knuckle and a steering arm. The steering knuckle may have a first arm and a second arm. The steering arm may have a first prong and a second prong. The steering arm may be coupled to the first arm such that the first arm may be disposed between the first prong and the second prong.

In at least one embodiment, a steering knuckle assembly is provided. The steering knuckle assembly may include a steering knuckle and a steering arm. The steering knuckle may have a first arm and a second arm. The first arm may have a first mating feature disposed proximate an end surface. The steering arm may be coupled to the first arm and may have a second mating feature that may mate with the first mating feature.

BRIEF DESCRIPTION OF THE DRAWINGS

FIG. 5 is a top view of the steering knuckle assembly of FIG. 4.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
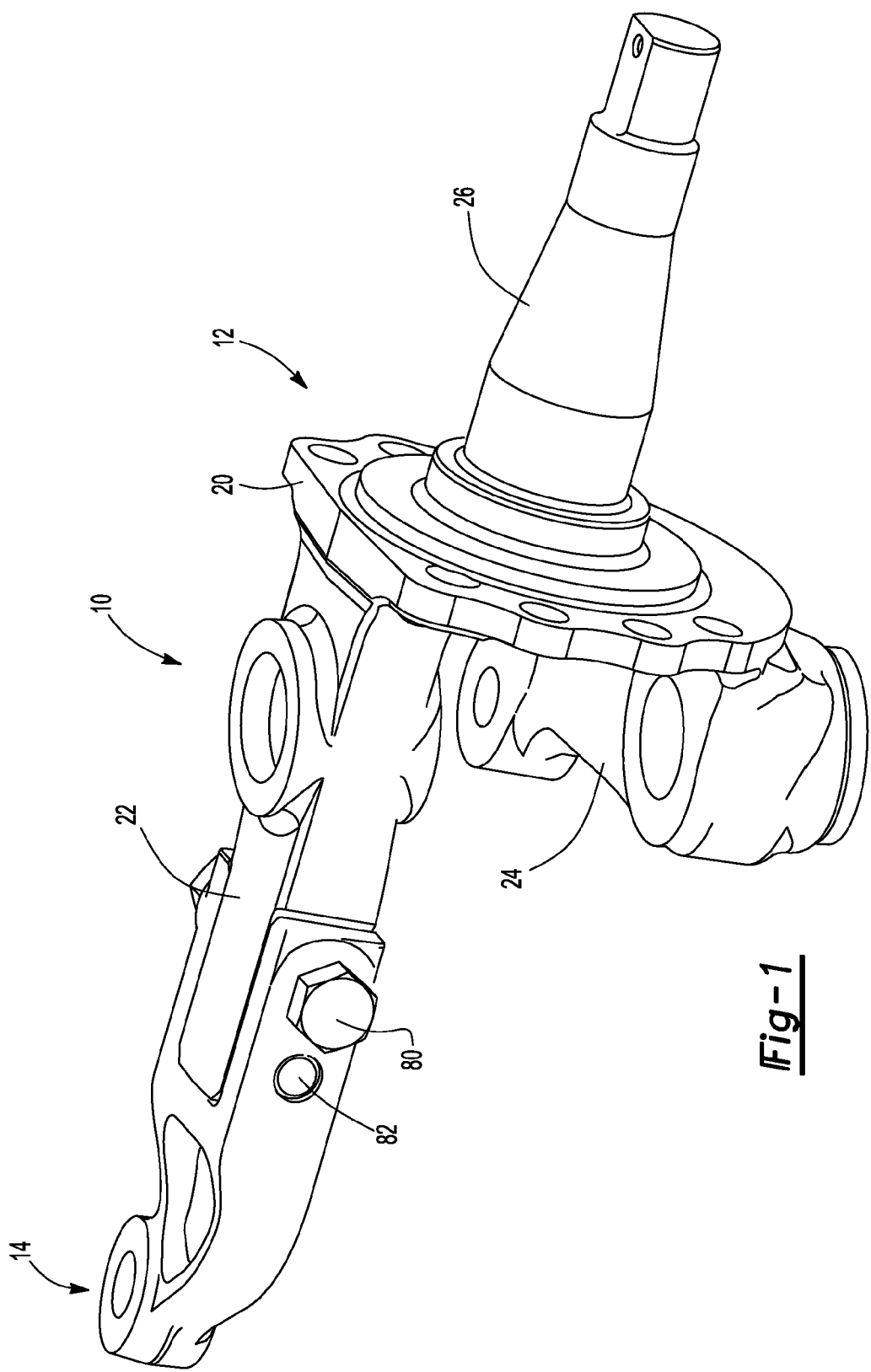
FIG. 1 is a perspective view of a first exemplary embodiment of a steering knuckle assembly.
Figure 2:
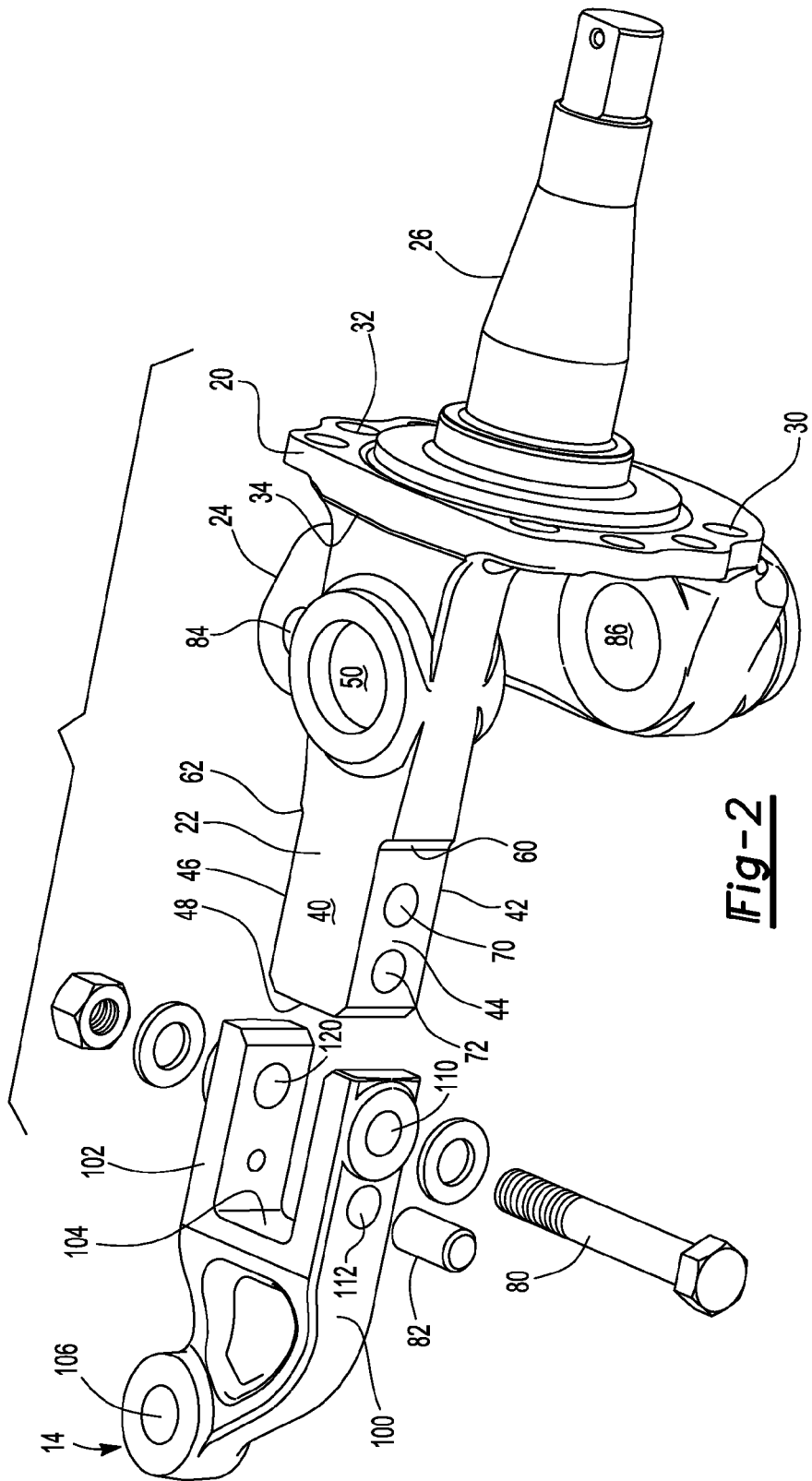
FIG. 2 is an exploded view of the steering knuckle assembly of FIG. 1.
Figure 3:
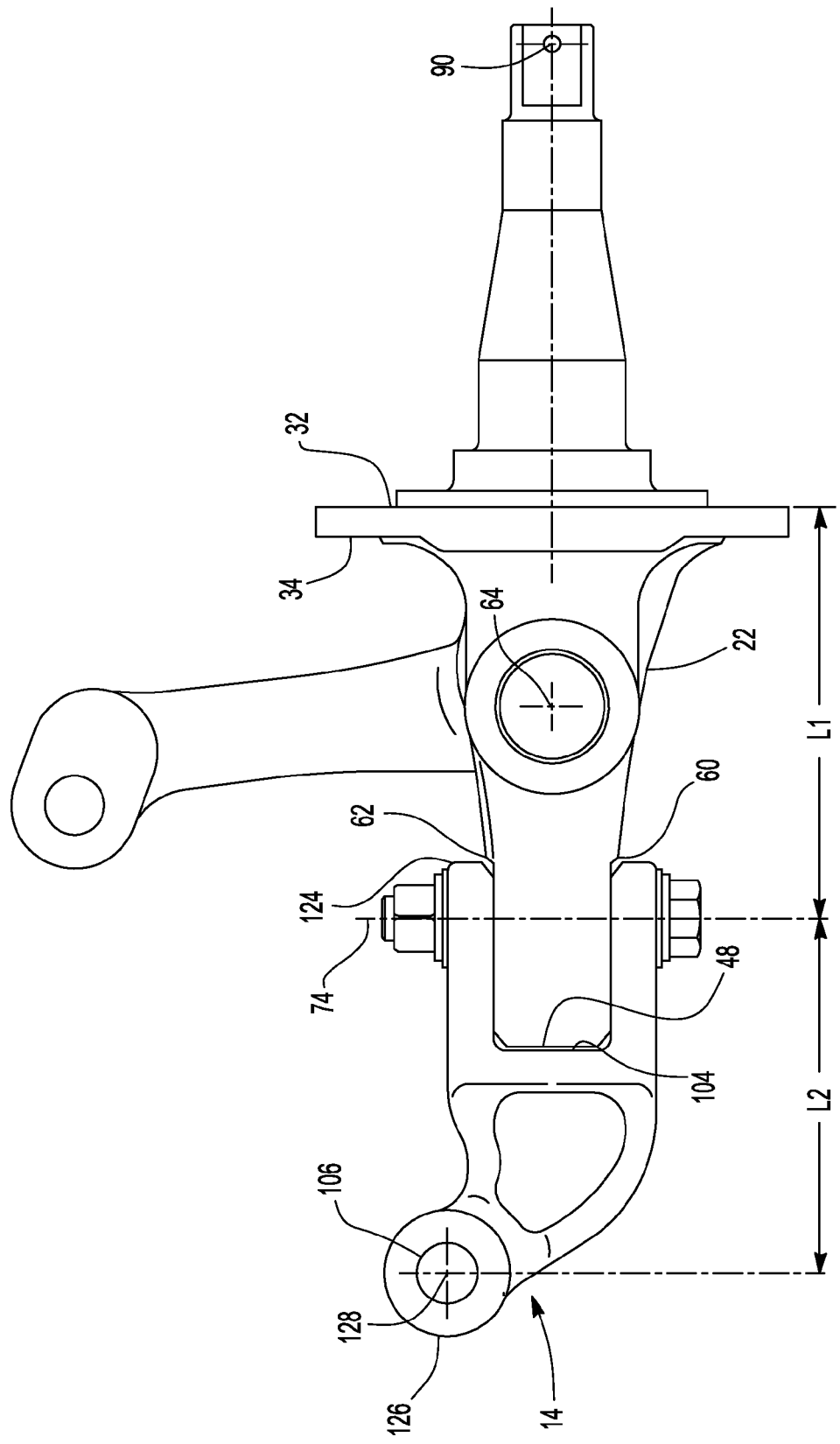
FIG. 3 is a top view of the steering knuckle assembly of FIG. 1.

Referring to FIGS. 1 through 3, an exemplary steering knuckle assembly 10 is shown. The steering knuckle assembly 10 may be provided with a motor vehicle like a truck, bus, farm equipment, military transport or weaponry vehicle, or cargo loading equipment for land, air, or marine vessels. The steering knuckle assembly 10 may be part of a steering system that may be used to steer or change the direction of the vehicle. In at least one embodiment, the steering knuckle assembly 10 may include a steering knuckle 12 and a steering arm 14.

The steering knuckle 12 may interconnect an axle beam, which may be mounted to the vehicle, to a vehicle wheel. In at least one embodiment, the steering knuckle 12 may be integrally formed or cast such that the steering knuckle 12 is provided as a unitary one-piece component. The steering knuckle 12 may include a body 20, a first arm 22, a second arm 24, and a spindle 26.

The body 20 may provide structural support for the steering knuckle 12 and may facilitate mounting of other components to the steering knuckle 12. In at least one embodiment, the body 20 may include a plurality of brake caliper mounting holes 30. The brake caliper mounting holes 30 may be disposed near the periphery or outside perimeter of the body 20. One or more brake caliper mounting holes 30 may be configured to receive a corresponding fastener that may facilitate mounting of a brake caliper to the steering knuckle 12. In at least one embodiment, the brake caliper mounting holes 30 may extend from a first surface 32 to a second surface 34. The first surface 32 of the body 20 may face outboard or away from the axle beam and toward a vehicle wheel. The second surface 34 of the body 20 may be disposed opposite the first surface 32 and may face toward the axle beam and the steering arm 14.

The first arm 22 may extend from the body 20. More specifically, the first arm 22 may extend away from the second surface 34 or from a side of the body 20 that may include the second surface 34. The first arm 22 may extend in an opposite direction from the spindle 26 and may be disposed above the spindle 26 near the top of the body 20. The first arm 22 may include an upper surface 40, a lower surface 42, a first side surface 44, a second side surface 46, an end surface 48, and a first kingpin hole 50.

The upper surface 40 may be disposed along a top of the first arm 22. As such, the upper surface 40 may face away from the axle beam and the second arm 24.

The lower surface 42 may be disposed opposite the upper surface 40. The lower surface 42 may be disposed proximate and may face toward the axle beam. In addition, the lower surface 42 may face toward the second arm 24.

The first side surface 44 may extend between the upper surface 40 and the lower surface 42. In addition, the first side surface 44 may extend from the end surface 48 toward the body 20. In at least one embodiment, the first side surface 44 may extend to a first step surface 60. The first step surface 60 may be disposed between the end surface 48 and the second surface 34 and may extend outwardly or away from the first side surface 44 such that the first arm 22 becomes wider closer to the body 20. In addition, the first step surface 60 may be disposed between the first kingpin hole 50 and one or more fastener holes as will be discussed below.

The second side surface 46 may be disposed opposite the first side surface 44. The second side surface 46 may extend between the upper surface 40 and the lower surface 42. In addition, the second side surface 46 may extend from the end surface 48 toward the body 20. In at least one embodiment, the second side surface 46 may extend to a second step surface 62. The second step surface 62 may be disposed opposite and may extend away from the first step surface 60. The second step surface 62 may extend outwardly or away from the second side surface 46. In addition, the second step surface 62 may be disposed between the first kingpin hole 50 and one or more fastener holes as will be discussed below.

The end surface 48 may be disposed at a distal end of the first arm 22. The end surface 48 may extend from the upper surface 40 to the lower surface 42. In addition, the end surface 48 may extend from the first side surface 44 to the second side surface 46. The end surface 48 may be disposed opposite the first surface 32 of the body 20 and may extend substantially parallel to the first surface 32 in one or more embodiments.

The end surface 48 may be spaced apart from and may not engage the steering arm 14 in one or more embodiments.

The first kingpin hole 50 may be configured to receive a kingpin that may couple the steering knuckle 12 to the axle beam such that the steering knuckle 12 may pivot about the kingpin. In at least one embodiment, the first kingpin hole 50 may be a through hole that may extend through the first arm 22 from the upper surface 40 to the lower surface 42. The first kingpin hole 50 and the kingpin may be disposed along a kingpin axis 64.

One or more fastener holes may be provided to facilitate mounting of the steering arm 14 to the first arm 22. In the embodiment shown in FIGS. 1-3, a first fastener hole 70 and a second fastener hole 72 are provided.

The first fastener hole 70 may be disposed between the second fastener hole 72 and the first kingpin hole 50. The first fastener hole 70 may extend along a first axis 74. The first fastener hole 70 may extend into the first arm 22 and may or may not extend completely through the first arm 22. In FIGS. 1-3, the first fastener hole 70 is configured as a through hole that may extend from the first side surface 44 to the second side surface 46. The first fastener hole 70 may be disposed between the end surface 48 and the first kingpin hole 50. As such, the first fastener hole 70 may be spaced apart from the end surface 48.

The first fastener hole 70 may be configured to receive a first fastener 80. The first fastener 80 may extend into the steering arm 14 and the first arm 22 to couple the steering arm 14 to the first arm 22. The first fastener 80 may have any suitable configuration. For example, the first fastener 80 may be a threaded fastener, such as a bolt, or a non-threaded fastener, such as a pin. In FIG. 2, the first fastener 80 is configured as a bolt that may be coupled to a nut to inhibit axial movement of the first fastener 80. It is also contemplated that multiple fasteners may be received in the first fastener hole 70, such as multiple threaded or non-threaded fasteners that may extend into opposite ends of the first fastener hole 70.

The second fastener hole 72 may be spaced apart from the first fastener hole 70. In at least one embodiment, the second fastener hole 72 may be disposed between the end surface 48 and the first fastener hole 70. The second fastener hole 72 may or may not extend completely through the first arm 22. For example, the second fastener hole 72 may be configured as a blind hole that may extend from the first side surface 44 toward the second side surface 46 or may be configured as a through hole that may have a decreasing diameter. The second fastener hole 72 may be disposed between the end surface 48 and the first kingpin hole 50. As such, the second fastener hole 72 may be spaced apart from the end surface 48.

The second fastener hole 72 may be configured to receive a second fastener 82. The second fastener 82 may extend into the steering arm 14 and the first arm 22 to couple the steering arm 14 to the first arm 22. The second fastener 82 may have any suitable configuration. For instance, the second fastener 82 may be a threaded fastener, such as a bolt, or a non-threaded fastener, such as a pin. The second fastener 82 may or may not extend completely through the first arm 22 depending on the configuration of second fastener hole 72. In addition, the second fastener 82 may or may not have the same configuration as the first fastener 80. In FIG. 2, the second fastener 82 has a different configuration than the first fastener 80 and is configured as a pin and that does not extend completely through the first arm 22. Alternatively, the first and second fasteners 80, 82 may have the same or similar configurations and may be configured as threaded or non-threaded fasteners that may extend through similarly configured first and second fastener holes 70, 72. The second fastener hole 72 and the second fastener 82 may be disposed between the end surface 48 and the first fastener hole 70 and first fastener 80; however, it is contemplated that the first and second fastener holes 70, 72 and first and second fasteners 80, 82 may be reversed from the configuration shown in FIG. 2 in one or more embodiments.

The first arm 22 may have a first length L1. As is best shown in FIG. 3, the first length L1 may be a linear distance that may extend from the first surface 32 to the first axis 74.

The second arm 24 may extend from the body 20 and may be spaced apart from the first arm 22. Like the first arm 22, the second arm 24 may extend from a side of the body 20 that may include the second surface 34 and may extend away from the second surface 34 in an opposite direction from the spindle 26. The second arm 24 may be disposed below the axle beam and the spindle 26 and near the bottom of the body 20. The second arm 24 may primarily extend in a different direction than the first arm 22. As is best shown in FIG. 3, the second arm 24 may extend generally perpendicular to the first arm 22. In addition, the entire second arm 24 may be disposed closer to the body 20 and first surface 32 than the end surface 48 and/or first and second fastener holes 70, 72. In at least one embodiment, the second arm 24 may include a tie rod mounting hole 84 and second kingpin hole 86.

The tie rod mounting hole 84 may facilitate coupling of the second arm 24 to a tie rod. The tie rod mounting hole 84 may be disposed proximate a distal end of the second arm 24 and may be disposed further from a spindle axis 90 than the periphery of the body 20.

The second kingpin hole 86 may be coaxially disposed with the first kingpin hole 50 and may be configured to receive the kingpin. In at least one embodiment, the second kingpin hole 86 may be a through hole that may extend through the second arm 24. As is best shown in FIG. 3, the second kingpin hole 86 may be disposed closer to the body 20 and the second surface 34 than the first kingpin hole 50.

The spindle 26 may support a wheel hub assembly that may facilitate mounting and rotation of a vehicle wheel. More specifically, the spindle 26 may support one or more wheel bearings that support and facilitate rotation of a wheel hub and/or vehicle wheel. The spindle 26 may extend along the spindle axis 90 that may extend away from the axle beam. In at least one embodiment, the spindle 26 and spindle axis 90 may extend substantially perpendicular to the first surface 32. The spindle 26 may be integrally formed with the body 20 or may be provided as a separate component that is fastened to the body 20 in one or more embodiments.

The steering arm 14 may interconnect or couple the steering knuckle 12 to a tie rod. The steering arm 14 may be coupled to the first arm 22 of the steering knuckle 12 and may be spaced apart from the second arm 24. Moreover, the steering arm 14 may be coupled to the first arm 22 such that the steering arm 14 does not rotate or move with respect to the first arm 22. The steering arm 14 may be provided as a separate component from the steering knuckle 12 to permit a common steering knuckle configuration to be used on multiple vehicle models while utilizing different steering arm configurations to accommodate different steering geometries for specific vehicle models, thereby reducing cost. In at least one embodiment, the steering arm 14 may include a first prong 100, a second prong 102, a connection surface 104, and a mounting hole 106.

The first prong 100 may be disposed proximate or may engage the first side surface 44 of the first arm 22. An end surface of the first prong 100 may be disposed proximate the first step surface 60. In addition, the first prong 100 may include one or more fastener openings that may receive a corresponding fastener. In at least one embodiment, the first prong 100 may include a first fastener opening 110 and a second fastener opening 112. The first and second fastener openings 110, 112 may be coaxially disposed with or aligned with the first and second fastener holes 70, 72, respectively. The first and second fastener openings 110, 112 may be configured as through holes in one or more embodiments.

The second prong 102 may be disposed opposite and may be spaced apart from the first prong 100. The second prong 102 may be disposed proximate or may engage the second side surface 46 of the first arm 22. In at least one embodiment, the first and second prongs 100, 102 may have the same or similar lengths. An end surface of the second prong 102 may be disposed proximate the second step surface 62. In addition, the second prong 102 may include one or more fastener openings that may receive a corresponding fastener. In at least one embodiment, the second prong 102 may include a first fastener opening 110 that may be coaxially disposed with or aligned with the first fastener hole 70 and the first fastener opening 110. As such, the first fastener 80 may extend through the first prong 100 and the second prong 102 while the second fastener 82 may extend through the first prong 100 but not the second prong 102. It is also contemplated that the second prong 102 may include a second fastener opening that may be coaxially disposed with or aligned with the second fastener hole 72 and the second fastener opening 112 of the first prong 100 in one or more embodiments.

The connection surface 104 may extend from the first prong 100 to the second prong 102. The connection surface 104 may be disposed proximate the end surface 48 of the first arm 22. In at least one embodiment, the connection surface 104 may be spaced apart from the end surface 48 to facilitate assembly and alignment of the fastener holes and fastener openings. Moreover, the connection surface 104 may be disposed sufficiently close to the end surface 48 to inhibit rotation of the steering arm 14 with respect to the first arm 22 to inhibit misalignment of the steering arm 14.

As is best shown in FIG. 3, the steering arm 14 may have a first end 124 and a second end 126. An end surface or end surfaces of the first and/or second prongs 100, 102 may define the first end 124. The second end 126 may be disposed opposite the first end 124 and may be a point or surface that may be disposed furthest from the first arm 22 or the end surface 48 of the first arm 22. The mounting hole 106 may be disposed proximate the second end 126 and may extend along or be centered with respect to a second axis 128. The mounting hole 106 may facilitate coupling of the steering arm 14 to a drag link via a ball stud.

The steering arm 14 may have a second length L2. The second length L2 may be a perpendicular distance from the first axis 74 to the second axis 128. The second length L2 may be less than the first length L1 to reduce the moment arm length and torque exerted upon the first fastener 80 and/or the second fastener 82.

Figure 4:
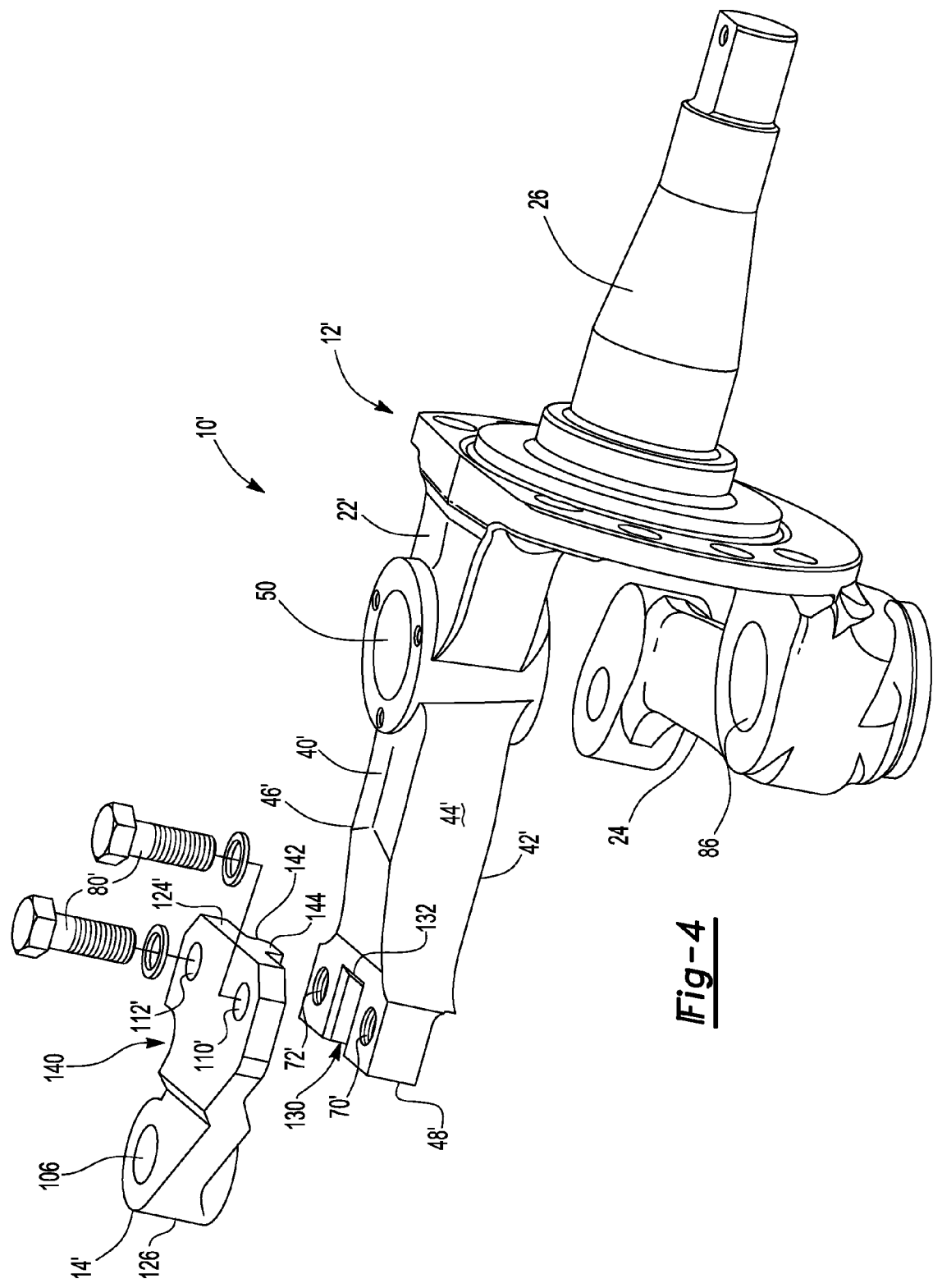
FIG. 4 is an exploded view of a second exemplary embodiment of a steering knuckle assembly.

Referring to FIGS. 4 and 5, another embodiment of a steering knuckle assembly 10' is shown that includes a steering knuckle 12' and a steering arm 14'. The same reference numbers are used in FIGS. 4 and 5 to reference features that are similar or identical to those shown in FIGS. 1-3.

The steering knuckle 12' may have a similar configuration to the steering knuckle 12' shown in FIGS. 1-3. In this embodiment, the first arm 22' has first and second fastener holes 70', 72' that may be spaced apart from the end surface 48' and that may extend from the upper surface 40' to the lower surface 42'. The first fastener hole 70' may extend along a first axis 74'.

A first mating feature 130 may be provided with the first arm 22' and may be disposed proximate the end surface 48'. The first mating feature 130 may be disposed between and may be spaced apart from the first fastener hole 70' and the second fastener hole 72'. The first mating feature 130 may also be disposed between the first side surface 44' and the second side surface 46'. The first mating feature 130 may have any suitable configuration, such as a male or female configuration. In FIG. 4, the first mating feature 130 may have a female configuration and may be configured as a groove that may extend from the end surface 48' to a first mating feature end surface 132. The first mating feature end surface 132 may also be provided in the upper surface 40' and may extend from the upper surface 40' toward the lower surface 42'. In addition, the first mating feature end surface 132 may be disposed between the end surface 48' and the first kingpin hole 50. The first and second fastener holes 70', 72' may each receive a fastener 80', such as a bolt, that may couple the steering arm 14' to the first arm 22'.

The steering arm 14' may be coupled to the first arm 22'. The steering arm 14' may include a mounting flange portion 140 that may include a first fastener opening 110', a second fastener opening 112', a first end 124', a second end 126, and a second mating feature 142. The mounting flange portion 140 may be disposed proximate the upper surface 40' and may be spaced apart from the lower surface 42'.

The first and second fastener openings 110', 112' may be aligned with first and second fastener holes 70', 72', respectively, and may each receive a fastener 80'.

The second mating feature 142 may be configured to mate with the first mating feature 130. The second mating feature 142 may be disposed between and may be spaced apart from the first fastener opening 110' and the second fastener opening 112'. The second mating feature 142 may have any suitable configuration, such as a male or female configuration. In FIG. 4, the second mating feature 142 has a male configuration and may be configured as a protrusion that may extend into the first mating feature 130. The second mating feature 142 may have a second mating feature end surface 144 that may engage the first mating feature end surface 132.

The first end 124' of the steering arm 14' may be disposed proximate the first arm 22' and may include or extend to the second mating feature end surface 144. The second end 126 may be disposed opposite the first end 124' and may be a point or surface that may be disposed furthest from the first arm 22' or the end surface 48' of the first arm 22'. The mounting hole 106 may be disposed proximate the second end 126.

The steering arm 14' may have a second length L2'. The second length L2' may be a perpendicular distance from the first axis 74' to the second axis 128. The first arm 22' may have a first length L1'. The first length L1' may be a perpendicular distance from the first surface 32 to the first axis 74'. The second length L2' may be less than the first length L1' to reduce torque exerted upon one or more fasteners 80'. The second length L2' may also be less than a linear distance L3'. Linear distance L3' may extend from the kingpin axis 64 to the first axis 74' to help reduce moment arm length and torque or shearing force that may be exerted on one or more fasteners 80'. In addition, providing a steering knuckle assembly 10' having a second length L2' that is less than the third length L3' may reduce package space and provide design flexibility for brake caliper or brake assembly packaging.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A steering knuckle assembly comprising:
   a steering knuckle that includes a first arm and a second arm, wherein the first arm has:
   a first mating feature disposed proximate an end surface that extends from an upper surface to a lower surface that is disposed opposite the upper surface; and
   first and second fastener holes that extend from the upper surface toward the lower surface and are spaced apart from and do not engage the end surface; and
   a steering arm that is coupled to the first arm, wherein the steering arm has a second mating feature that mates with the first mating feature;
   wherein the first and second fastener holes each receive a fastener that couples the steering arm to the first arm.

2. The steering knuckle assembly of claim 1 wherein the first mating feature is a groove that extends from the end surface.

3. The steering knuckle assembly of claim 2 wherein the second mating feature is a protrusion that is received in the groove.

4. The steering knuckle assembly of claim 2 wherein the steering knuckle has a first surface that is disposed opposite the end surface, the first mating feature extends from the end surface to a first mating feature end surface that is disposed between the end surface and the first surface, and the second mating feature has a second mating feature end surface that engages the first mating feature end surface.

5. The steering knuckle assembly of claim 1 wherein the first mating feature is disposed between the first and second fastener holes.

6. The steering knuckle assembly of claim 1 wherein the first mating feature is provided in the upper surface and extends from the end surface.

7. The steering knuckle assembly of claim 6 wherein the steering arm has a mounting flange portion that is disposed proximate the upper surface and is spaced apart from the lower surface.

8. The steering knuckle assembly of claim 1 wherein the steering knuckle has a body, wherein the second arm in its entirety is disposed closer to the body than the steering arm.

9. The steering knuckle assembly of claim 1 wherein the first arm has a first kingpin hole and the steering arm has a first end disposed proximate the first arm and a second end that is spaced apart from and disposed furthest from the first arm, wherein a perpendicular distance from the first end to the second end is less than a distance from the first kingpin hole to the steering arm.

10. The steering knuckle assembly of claim 1 wherein the steering knuckle has a first surface that is disposed opposite the end surface and wherein all of the steering arm is disposed further from the first surface than the second arm.

11. A steering knuckle assembly comprising:
   a steering knuckle that includes a body, a first arm that extends from the body and that has a first kingpin hole, and a second arm that extends from the body and that has a second kingpin hole, wherein the first arm has a first fastener hole, a second fastener hole, and an end surface disposed opposite the body, wherein the first and second fastener holes are disposed between the end surface and the first kingpin hole;
   a steering arm that includes a first end that engages the first arm, a second end that is spaced apart from the first arm, a mounting hole that is disposed proximate the second end, and first and second fastener openings that are disposed between the first end and the second end; and
   first and second fasteners that couple the steering arm to the steering knuckle, wherein the first fastener is disposed along a first axis and extends through the first fastener opening and into first fastener hole and the second fastener extends through the second fastener opening and into the second fastener hole, and wherein the mounting hole is centered about a second axis that extends substantially parallel to the first axis.

12. The steering knuckle assembly of claim 11 wherein the body has a first surface, a second surface disposed opposite the first surface, and a spindle that extends from the first surface, wherein the first arm and the second arm extend from the second surface and in an opposite direction from the spindle.

13. The steering knuckle assembly of claim 12 wherein the first arm has a first mating feature that extends from the end surface toward the first kingpin hole and that is disposed between the first fastener hole and the second fastener hole.

14. The steering knuckle assembly of claim 13 wherein the first arm has an upper surface and a lower surface disposed opposite the upper surface, wherein the first mating feature extends from the upper surface toward the lower surface such that first mating feature is spaced apart from the lower surface.

15. The steering knuckle assembly of claim 14 wherein the steering arm has a second mating feature that is disposed between the first fastener opening and the second fastener opening and that is received in the first mating feature such that the first mating feature engages the second mating feature.

16. The steering knuckle assembly of claim 15 wherein the first mating feature has a first mating feature end surface that extends from the upper surface toward the lower surface and the second mating feature has a second mating feature end surface that engages the first mating feature end surface.

17. The steering knuckle assembly of claim 12 wherein the steering knuckle has a first length that extends from the first surface to the first axis and the steering arm has a second length that extends from the first axis to the second axis, wherein the second length is less than the first length to reduce torque exerted upon the first fastener.

18. The steering knuckle assembly of claim 17 wherein the first kingpin hole is disposed along a kingpin axis, wherein the steering knuckle assembly has a third length that extends from the kingpin axis to the first axis, wherein the second length less than the third length.

19. The steering knuckle assembly of claim 17 wherein the spindle extends along a spindle axis and the second arm includes a tie rod mounting hole that is disposed proximate a distal end of the second arm, wherein the tie rod mounting hole is disposed further from a spindle axis than the mounting hole.

* * * * *

UNITED STATES PATENT AND TRADEMARK OFFICE
CERTIFICATE OF CORRECTION

| | | |
|---|---|---|
| PATENT NO. | : 9,090,283 B1 | Page 1 of 1 |
| APPLICATION NO. | : 14/184083 | |
| DATED | : July 28, 2015 | |
| INVENTOR(S) | : Duy Lam et al. | |

It is certified that error appears in the above-identified patent and that said Letters Patent is hereby corrected as shown below:

In the claims

Column 8, Line 12, Claim 11:

After "opening and into"
Insert -- the --.

Column 8, Line 54, Claim 18:

After "length"
Insert -- is --.

Signed and Sealed this
Twelfth Day of January, 2016

Michelle K. Lee
*Director of the United States Patent and Trademark Office*